United States Patent
Kubis et al.

(10) Patent No.: US 11,372,948 B2
(45) Date of Patent: Jun. 28, 2022

(54) METHOD OF MODELING MANY PARTICLE SYSTEM

(71) Applicant: Purdue Research Foundation, West Lafayette, IN (US)

(72) Inventors: Tillmann Kubis, West Lafayette, IN (US); Prasad Sarangapani, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 147 days.

(21) Appl. No.: 16/684,766

(22) Filed: Nov. 15, 2019

(65) Prior Publication Data

US 2020/0159807 A1 May 21, 2020

Related U.S. Application Data

(60) Provisional application No. 62/768,710, filed on Nov. 16, 2018.

(51) Int. Cl.
| | |
|---|---|
| *G06F 17/13* | (2006.01) |
| *G06F 30/20* | (2020.01) |
| *G06F 17/12* | (2006.01) |
| *G06F 111/10* | (2020.01) |

(52) U.S. Cl.
CPC .............. *G06F 17/13* (2013.01); *G06F 17/12* (2013.01); *G06F 30/20* (2020.01); *G06F 2111/10* (2020.01)

(58) Field of Classification Search
CPC .......... G06F 17/13; G06F 30/20; G06F 17/12; G06F 2111/10
See application file for complete search history.

(56) References Cited

U.S. PATENT DOCUMENTS

2018/0144076 A1* 5/2018 Liu .................. G06F 30/20

OTHER PUBLICATIONS

Kubis, T.C., 2009. Quantum transport in semiconductor nanostructures. (Year: 2009).*
A. Esposito, M. Frey, and A. Schenk, Quantum transport including nonparabolicity and phonon scattering: Application to silicon nanowires, J. Comput. Electron. 8, 336 (2009).

(Continued)

*Primary Examiner* — Chuen-Meei Gan
(74) *Attorney, Agent, or Firm* — Maginot, Moore & Beck LLP

(57) ABSTRACT

A non-transitory machine-readable storage medium is disclosed, which stores a program for modeling a many particle system. When executed on a processing system, the program causes the processing system to (1) determine a compensation function that, when applied to a plurality of interaction equations, compensates for errors introduced by an approximation included in at least one of the plurality of interaction equations, (2) determine an uncompensated solution of the many particle system by solving the many particle system without the plurality of interaction equations, (3) calculate a plurality of observables in the many particle system by solving the many particle system with the plurality of interaction equations by a first iteration, and (4) model the many particle system based on the plurality of observables.

18 Claims, 2 Drawing Sheets

(56) References Cited

OTHER PUBLICATIONS

S. Goodnick and P. Lugli, Effect of electron-electron scattering on nonequilibrium transport in tems, Phys. Rev. B 37, 2578 (1988).
U. Aeberhard, Challenges in the negf simulation of quantum-well photovoltaics posed by non-locality and localization, Phys. Status Solidi (b) 256, 1800500 (2019).
S. Datta, Quantum Transport: Atom to Transistor (Cambridge University Press, 2005).
Y. P. Tan, M. Povolotskyi, T. Kubis, T. B. Boykin, and G. Klimeck, Tight-binding analysis of Si and GaAs ultrathin bodies with subatomic wave-function resolution, Phys. Rev. B 92, 085301 (2015).
J. D. Dow and D. Redfield, Toward a unified theory of urbach's rule and exponential absorption edges, Phys. Rev. B 5, 594 (1972).
M. A. Khayer and R. K. Lake, Effects of band-tails on the subthreshold characteristics of nanowire band-toband tunneling transistors, J. Appl. Phys. 110, 074508 (2011).
G. Antonioli, D. Bianchi, and P. Franzosi, Intrinsic urbach rule and electron-phonon interaction in GaAs and related III-V compounds, Phys. Status Solidi (b) 106, 79 (1981).
S. Johnson and T. Tiedje, Temperature dependence of the Urbach edge in GaAs, J. Appl. Phys. 78, 5609 (1995).
S. Chichibu, T. Mizutani, T. Shioda, H. Nakanishi, T. Deguchi, T. Azuhata, T. Sota, and S. Nakamura, Urbach-martienssen tails in a wurtzite GaN epilayer, Appl. Phys. Lett. 70, 3440 (1997).
S. Jain, J. McGregor, and D. Roulston, Band-gap narrowing in novel III-V semiconductors, J. Appl. Phys. 68, 3747 (1990).
N.-Y. Lee, K.-J. Lee, C. Lee, J.-E. Kim, H. Y. Park, D.-H. Kwak, H.-C. Lee, and H. Lim, Determination of conduction band tail and fermi energy of heavily Si-doped GaAs by room-temperature photoluminescence, J. Appl. Phys. 78, 3367 (1995).
H. Yao and A. Compaan, Plasmons, photoluminescence, and bandgap narrowing in very heavily doped n-GaAs, Appl. Phys. Lett. 57, 147 (1990).
H. Luo, W. Shen, Y. Zhang, and H. Yang, Study of band gap narrowing effect in n-GaAs for the application of farinfrared detection, Phys. B: Condens. Matter 324, 379 (2002).
E. Harmon, M. Melloch, and M. Lundstrom, Effective band-gap shrinkage in GaAs, Appl. Phys. Lett. 64, 502 (1994).
G. Borghs, K. Bhattacharyya, K. Deneffe, P. Van Mieghem, and R. Mertens, Band-gap narrowing in highly doped n-and p-type GaAs studied by photoluminescence spectroscopy, J. Appl. Phys. 66, 4381 (1989).
A. Oschlies, R. Godby, and R. Needs, First-principles selfenergy calculations of carrier-induced band-gap narrowing in silicon, Phys. Rev. B 45, 13741 (1992).
Lake, Roger, Gerhard Klimeck, R. Chris Bowen, and Dejan Jovanovic. "Single and multiband modeling of quantum electron transport through layered semiconductor devices." Journal of Applied Physics 81, No. 12 (1997): 7845-7869.
Anantram, M. P., Mark S. Lundstrom, and Dmitri E. Nikonov. "Modeling of nanoscale devices." Proceedings of the IEEE96, No. 9 (2008): 1511-1550.
Kubis, T., and P. Vogl. "Assessment of approximations in nonequilibrium Green's function theory." Physical Review 883, No. 19 (2011): 195304.
Barker, J. R., A. Martinez, and M. Aldegunde. "Compliant energy and momentum conservation in NEGF simulation of electron-phonon scattering in semiconductor nano-wire transistors." In Journal of Physics: Conference Series, vol. 367, No. 1, p. 012012. IOP Publishing, 2012.
Blanks, Manhua Leng, Ted Moise, Y. C. Kao, and William R. Frensley. "Numerical Approximations for Polar Optical Phonon Scattering in Resonant Tunneling Diodes."
Charles, James and Sarangapani, Prasad and Chu, Yuanchen and Klimeck, Gerhard and Kubis, Tillmann, "Non-local scattering with a new recursive nonequilibrium green's function method", International Workshop on Computational Nanotechnology, 2017.

E. Lind, E. Memišević, A. W. Dey, and L.-E. Wernersson, III-V heterostructure nanowire tunnel FETs, IEEE J. Electron Devices Soc. 3, 96 (2015).
U. E. Avci, D. H. Morris, and I. A. Young, Tunnel fieldeffect transistors: Prospects and challenges, IEEE J. Electron Devices Soc. 3, 88 (2015).
A. C. Seabaugh and Q. Zhang, Low-voltage tunnel transistors for beyond CMOS logic, Proc. IEEE 98, 2095 (2010).
J. Geng, P. Sarangapani, K.-C. Wang, E. Nelson, B. Browne, C. Wordelman, J. Charles, Y. Chu, T. Kubis, and G. Klimeck, Quantitative multi-scale, multi-physics quantum transport modeling of GaN-based light emitting diodes, Phys. Status Solidi (a) 215, 1700662 (2018).
A. Laubsch, M. Sabathil, J. Baur, M. Peter, and B. Hahn, High-power and high-efficiency InGaN-based light emitters, IEEE Trans. Electron Devices 57, 79 (2010).
W. Guo, M. Zhang, A. Banerjee, and P. Bhattacharya, Catalyst-free InGaN/GaN nanowire light emitting diodes grown on (001) silicon by molecular beam epitaxy, Nano Lett. 10, 3355 (2010).
P. Krogstrup, H. I. Jørgensen, M. Heiss, O. Demichel, J. V. Holm, M. Aagesen, J. Nygård, and A. F. I. Morral, Singlenanowire solar cells beyond the Shockley-Queisser limit, Nat. Photonics 7, 306 (2013).
C. G. Bailey, D. V. Forbes, R. P. Raffaelle, and S. M. Hubbard, Near 1 V open circuit voltage InAs/GaAs quantum dot solar cells, Appl. Phys. Lett. 98, 163105 (2011).
J. Wallentin, N. Anttu, D. Asoli, M. Huffman, I. Åberg, M. H. Magnusson, G. Siefer, P. Fuss-Kailuweit, F. Dimroth, B. Witzigmann et al., InP nanowire array solar cells achieving 13.8% efficiency by exceeding the ray optics limit, Science 339, 1057 (2013).
S. Agarwal and E. Yablonovitch, Band-edge steepness obtained from Esaki/backward diode current-voltage characteristics, IEEE Trans. Electron Devices 61, 1488 (2014).
J. Bizindavyi, A. S. Verhulst, Q. Smets, D. Verreck, B. Sorée, and G. Groeseneken, Band-tails tunneling resolving the theory-experiment discrepancy in Esaki diodes, IEEE J. Electron Devices Soc. 6, 633 (2018).
H. Lu and A. Seabaugh, Tunnel field-effect transistors: State-of-the-art, IEEE J. Electron Devices Soc. 2, 44 (2014).
M. Oehme, M. Gollhofer, D. Widmann, M. Schmid, M. Kaschel, E. Kasper, and J. Schulze, Direct bandgap narrowing in Ge LED's on Si substrates, Opt. Express 21, 2206 (2013).
A. Schenk, Finite-temperature full random-phase approximation model of band gap narrowing for silicon device simulation, J. Appl. Phys. 84, 3684 (1998).
B. E. Semelius, Band-gap shifts in heavily p-type doped semiconductors of the zinc-blende and diamond type, Phys. Rev. B 34, 5610 (1986).
B. Halperin and M. Lax, Impurity-band tails in the highdensity limit. I. Minimum counting methods, Phys. Rev. 148, 722 (1966).
B. Halperin and M. Lax, Impurity-band tails in the highdensity limit. II. Higher order corrections, Phys. Rev. 153, 802 (1967).
P. Van Mieghem, Theory of band tails in heavily doped semiconductors, Rev. Mod. Phys. 64, 755 (1992).
S. John, C. Soukoulis, M. H. Cohen, and E. Economou, Theory of Electron Band Tails and the Urbach Opticalabsorption Edge, Phys. Rev. Lett. 57, 1777 (1986).
S. Jain and D. Roulston, A simple expression for band gap narrowing (BGN) in heavily doped Si, Ge, GaAs and GexSi1-x strained layers, Solid-State Electron. 34, 453 (1991).
H. Zhang, W. Cao, J. Kang, and K. Banerjee, in 2016 IEEE International Electron Devices Meeting (IEDM) (IEEE, San Francisco, 2016), p. 30.
S. Datta, Nanoscale device modeling: The Green's function method, Superlattices Microstruct. 28, 253 (2000).
R. Lake, G. Klimeck, R. C. Bowen, and D. Jovanovic, Single and multiband modeling of quantum electron transport through layered semiconductor devices, J. Appl. Phys. 81, 7845 (1997).
T. Markussen, A.-P. Jauho, and M. Brandbyge, Electron and phonon transport in silicon nanowires: Atomistic approach to thermoelectric properties, Phys. Rev. B 79, 035415 (2009).

(56) References Cited

OTHER PUBLICATIONS

S.C. Lee and A. Wacker, Nonequilibrium Green's function theory for transport and gain properties of quantum cascade structures, Phys. Rev. B 66, 245314 (2002).
S. Steiger, Modelling nano-LEDs, Ph.D. thesis, ETH Zurich (2009).
T. Kubis, C. Yeh, P. Vogl, A. Benz, G. Fasching, and C. Deutsch, Theory of nonequilibrium quantum transport and energy dissipation in terahertz quantum cascade lasers, Phys. Rev. B 79, 195323 (2009).
M. Luisier and G. Klimeck, Atomistic full-band simulations of silicon nanowire transistors: Effects of electronphonon scattering, Phys. Rev. B 80, 155430 (2009).
A. Afzalian, T. Vasen, P. Ramvall, T. Shen, J. Wu, and M. Passlack, Physics and performances of III-V nanowire broken-gap heterojunction TFETs using an efficient tightbinding mode-space NEGF model enabling million-atom nanowire simulations, J. Phys.: Condens. Matter 30, 254002 (2018).
T. A. Ameen, H. Ilatikhameneh, J. Z. Huang, M. Povolotskyi, R. Rahman, and G. Klimeck, Combination of equilibrium and nonequilibrium carrier statistics into an atomistic quantum transport model for tunneling heterojunctions, IEEE Trans. Electron Devices 64, 2512 (2017).
R. C. Bowen, G. Klimeck, R. K. Lake, W. R. Frensley, and T. Moise, Quantitative simulation of a resonant tunneling diode, J. Appl. Phys. 81, 3207 (1997).
P. Sarangapani, C. Weber, J. Chang, S. Cea, M. Povolotskyi, G. Klimeck, and T. Kubis, Atomistic tight-binding study of contact resistivity in Si/SiGe PMOS schottky contacts, IEEE Trans. Nanotechnol. 17, 968 (2018).
G. Hegde and R. Chris Bowen, Effect of realistic metal electronic structure on the lower limit of contact resistivity of epitaxial metal-semiconductor contacts, Appl. Phys. Lett. 105, 053511 (2014).
K. Miao, S. Sadasivam, J. Charles, G. Klimeck, T. Fisher, and T. Kubis, Büttiker probes for dissipative phonon quantum transport in semiconductor nanostructures, Appl. Phys. Lett. 108, 113107 (2016).
Y. Chu, J. Shi, K. Miao, Y. Zhong, P. Sarangapani, T. Fisher, G. Klimeck, X. Ruan, and T. Kubis, Thermal boundary resistance predictions with non-equilibrium Green's function and molecular dynamics simulations, arXiv:1908.11578 (2019).
P. Darancet, A. Ferretti, D. Mayou, and V. Olevano, Ab initio GW electron-electron interaction effects in quantum transport, Phys. Rev. B 75, 075102 (2007).
F. Riddoch and B. Ridley, On the scattering of electrons by polar optical phonons in quasi-2D quantum wells, J. Phys. C: Solid State Phys. 16, 6971 (1983).
M. V. Fischetti and S. E. Laux, Monte carlo analysis of electron transport in small semiconductor devices including band-structure and space-charge effects, Phys. Rev. B 38, 9721 (1988).
S. Steiger, M. Povolotskyi, H.-H. Park, T. Kubis, and G. Klimeck, NEMO5: A parallel multiscale nanoelectronics modeling tool, IEEE Trans. Nanotechnol. 10, 1464 (2011).
J.M. Jancu, F. Bassani, F. D. Sala, and R. Scholz, Transferable tight-binding parametrization for the group-III nitrides, Appl. Phys. Lett. 81, 4838 (2002).
Y. He, Y. Tan, Z. Jiang, M. Povolotskyi, G. Klimeck, and T. Kubis, Surface passivation in empirical tight binding, IEEE Trans. Electron Devices 63, 954 (2016).
J. Lindhard, On the properties of a gas of charged particles, Dan. Vid. Selsk Mat.-Fys. Medd. 28, 8 (1954).
H. Fröhlich, Interaction of electrons with lattice vibrations, Proc. R. Soc. Lond. A 215, 291 (1952).
Gallium nitride (GaN) dielectric constants: Datasheet from Landolt-Börnstein—Group III condensed matter. vol. 41a1α: "Group IV elements, IV-IV and III-V compounds. Part A—lattice properties" in springermaterials (https://dx.doi.org/10.1007/10551045_87), Copyright 2001 Springer-Verlag Berlin Heidelberg.
D. Strauch, Gan: phonon frequencies: Datasheet from Landolt-Bornstein—Group III condensed matter. vol. 44d "New data and updates for IV-IV, III-V, II-VI and I-VII compounds, their mixed crystals and diluted magnetic semiconductors" in springermaterials (https://dx.doi.org/10.1007/978-3-642-14148-5_222). Copyright 2011 Springer-Verlag Berlin Heidelberg.
D. Strauch, GaAs: phonon dispersion curves, phonon density of states, phonon frequencies: Datasheet from Landolt-Börnstein—Group III condensed matter. vol. 44d: "New data and updates for IV-IV, III-V, II-VI and I-VII compounds, their mixed crystals and diluted magnetic semiconductors" in springermaterials (https://dx.doi.org/10.1007/978-3-642-14148-5_102), copyright 2011 Springer-Verlag Berlin Heidelberg.
Gallium antimonide (GaSb) dielectric constants: Datasheet from Landolt-Börnstein—Group III condensed matter. vol. 41a1α: "Group IV elements, IV-IV and III-V compounds. Part A—Lattice properties" in springermaterials (https://dx.doi.org/10.1007/10551045_124), copyright 2001 Springer-Verlag Berlin Heidelberg.
Indium arsenide (InAs), dependence of phonons on uniaxial stress: Datasheet from Landolt-Bornstein—Group III condensed matter. vol. 41a1β: "Group IV elements, IV-IV and III-V compounds. Part B—Electronic, transport, optical and other properties" in springermaterials (https://dx.doi.org/10.1007/10832182_356), copyright 2002 Springer-Verlag Berlin Heidelberg.
E. C. Fernandes da Silva, InAs: dielectric constant: Datasheet from Landolt-Börnstein—Group III condensed matter. vol. 44c: "New data and updates for III-V, II-VI and I-VII compounds" in springermaterials (https://dx.doi.org/10.1007/978-3-540-92140-0_163), Copyright 2010 Springer-Verlag Berlin Heidelberg.
A. Wacker, Semiconductor superlattices: A model system for non-linear transport, Phys. Rep. 357, 1 (2002).

* cited by examiner

METHOD OF MODELING MANY PARTICLE SYSTEM

CROSS-REFERENCE TO RELATED APPLICATIONS

The present U.S. Patent Application is related to and claims the priority benefit of U.S. Provisional Patent Application Ser. No. 62/768,710, filed Nov. 16, 2018, the contents of which is hereby incorporated by reference in its entirety into this disclosure.

BACKGROUND

This section introduces aspects that may help facilitate a better understanding of the disclosure. Accordingly, these statements are to be read in this light and are not to be understood as admissions about what is or is not prior art.

Recursive Green's function approach is among the widely used numerical technique to solve Non-equilibrium Green's Function (NEGF) for realistic quantum devices. This approach makes use of the fact that observables such as density and density of states depend only on the diagonal of the Green's function. This allows one to solve only required diagonal blocks (along with few off-diagonal blocks required for current density calculation) and is completely equivalent to computing the Green's function by inverting the matrix. However, this places a restriction on the nature of self-energies. They can only be diagonal/block diagonal as only diagonal entries of Green's function as calculated. Hence, there is limited study of non-local scattering with NEGF in the literature. Among the studies done with non-local scattering, either local approximations are made where non-local entries in self energy are truncated or are simulated for the effective mass approach with full inversion, which restricts the types of devices that can be investigated. Diagonal approximation with a scaling factor to treat POP scattering has been investigated. However, it turns out that the scaling factor used in the study needs to be fit to specific device geometries and bias condition which makes the scaling factor highly device specific.

Recently, a non-local recursive Green's function (NL-RGF) technique has been developed that extends the computation of Green's function to any number of off-diagonal elements. This approach can now be employed to study any long-ranged scattering process. However, it does take considerable time and memory even for small non-locality range of 2 nm. For example: a full inversion to model the complete non-locality range in a 2×2×20 nm silicon nanowire would consume 150 gigabytes of memory. This augments the capability to study non-local scattering and is better than a simple local approximation, but numerical limitations limit us to study only small non-locality ranges and a study of complete non-locality is not possible for a reasonable device in a multiband basis. To augment this method and to provide a physics based numerically efficient non-local calculation approach, a physics based local approximation is developed based on the Fermi's golden rule.

SUMMARY

One aspect of the present application relates to a non-transitory machine readable storage medium having a machine readable program stored therein, wherein the machine readable program, when executed on a processing system, causes the processing system to perform a method of modeling a many particle system, wherein the method includes determining a compensation function, wherein the compensation function compensates errors introduced by an approximation of at least one of a plurality of interaction equations applied on the plurality of interaction equations, wherein the plurality of interaction equations includes the approximation. The method additionally includes solving at least a system of the many particle system without the plurality of interaction equations to extract an uncompensated solution of the many particle system. Additionally, the method includes solving the many particle system with the plurality of interaction equations by a first iteration to extract a plurality of observables in the many particle system, wherein the first iteration includes: solving the plurality of interaction equations depending on a preceding solution of the many particle system to extract an uncompensated solution of the plurality of interaction equations. Moreover, the first iteration includes applying the compensation function on the uncompensated solution of the plurality of interaction equations to extract a compensated solution of the plurality of interaction equations. Furthermore, the first iteration includes solving the at least the system of the many particle system with a preceding compensated solution of the plurality of interaction equations to extract an amended solution of the many particle system. Further, the first iteration includes comparing the preceding solution of the many particle system with the amended solution of the many particle system to determine a variation between the preceding solution of the many particle system and the amended solution of the many particle system. The first iteration additionally includes comparing the variation against a user defined convergence criteria, thereby ascertaining the plurality of observables of the preceding solution to the many particle system. Next, the first iteration includes modeling the many particle system based on the plurality of observables, wherein the plurality of observables comprises at least one of charge density, particle density, heat density, spin density, color charge density, chirality density, current density, particle current density, heat current density, spin current density, density of states, or chirality current density.

Moreover, the local approximation that is based on the Fermi's golden rule considers dimensionality of the device, size dependence, screening, and energy dependence in solving most of the problems present in the community regarding solving non-local scattering simulations. Furthermore, solving such non-local scattering simulation with the present methodology saves computational resources. For example: performing the present local approximation of 2×2×20 nm silicon nanowire that is based on the Fermi's golden rule leads to reduction of compute time by 150× compared to 2×2×20 nm silicon nanowire non-local calculation with non-locality range of 2 nm. Additionally, the peak simulation memory to perform the present local approximation of 2×2×20 nm silicon nanowire that is based on the Fermi's golden rule is only 4 gigabytes, compared to 32 gigabytes for the non-local calculation with non-locality range of 2 nm.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry, various features may not be drawn to scale and are used for illustration purposes only. In fact, the dimensions of the various features in the drawings may be arbitrarily increased or reduced for clarity of discussion.

DETAILED DESCRIPTION

Figure 1:
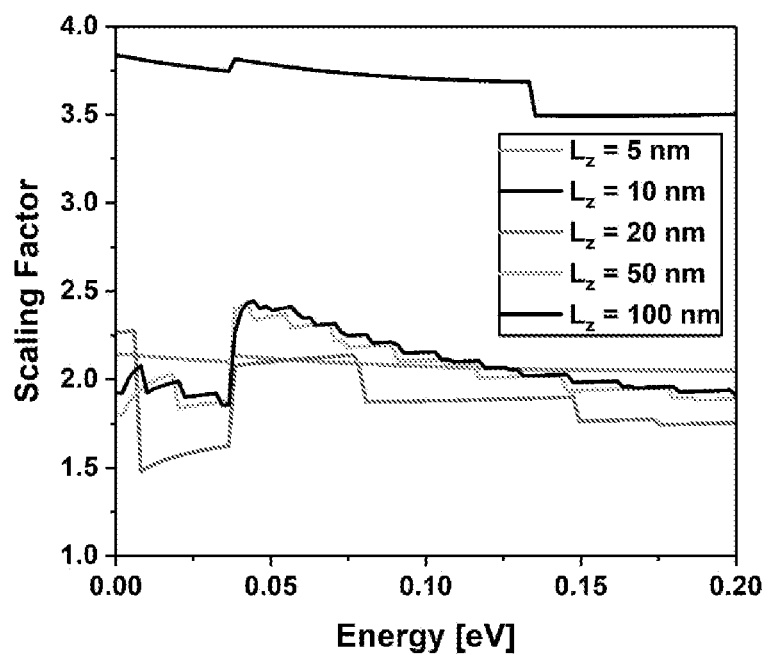
FIG. 1 illustrates the scaling factor variation with energy for different confinement thicknesses for GaAs ultra-thin body.

The following disclosure provides many different embodiments, or examples, for implementing different features of the present application. Specific examples of components and arrangements are described below to simplify the present disclosure. These are examples and are not intended to be limiting. The making and using of illustrative embodiments are discussed in detail below. It should be appreciated, however, that the disclosure provides many applicable concepts that can be embodied in a wide variety of specific contexts. In at least some embodiments, one or more embodiment(s) detailed herein and/or variations thereof are combinable with one or more embodiment(s) herein and/or variations thereof.

Local approximation model is based on the fact that the Fermi's golden rule for each scattering process has an associated form factor calculation which depends on the spatial scattering kernel. The current formalism is based on effective mass approach and assumes a parabolic dispersion but in principle, this approach can be applied to a general dispersion relation (which will be need for hole transport). Due to the dependence of scaling factor on spatial dependence, it has a well-defined expression only for the confined devices such as ultra-thin body and nanowire devices. Lack of a spatial dependence in bulk device prevents one from deriving such a similar expression within the Fermi's golden rule formalism. However, one can get the equivalent bulk result by having a large enough 2D device with requisite modes. This approach in its strictest form is only applicable at equilibrium or near-equilibrium situation where Fermi's golden rule holds good. Deriving such a scaling factor for non-equilibrium cases, would involve solving the propagating modes in the device. However, even with the equilibrium approximation, agreement with non-equilibrium simulation cases are not that far off. Taking the case of polar optical scattering, Fermi's golden rule expression (absorption branch) for ultra-thin body for polar optical phonon scattering can be written as:

$$\frac{1}{\tau_{ij,a}(E)} = \frac{4\pi e^2 m^* \hbar \omega_{LO}}{\hbar^3} \left( \frac{1}{\epsilon_\infty} - \frac{1}{\epsilon_s} \right) \left[ N_{ph} \int_0^{2\pi} d\theta F_a(|\vec{k}_\| - \vec{k}'_\||, \theta) \right] \quad (1)$$

where $F(q_\|) = \int_0^{L_z} \int_0^{L_z} dz dz' \rho_{ij}(z') I(q_\|, Z, Z')$ and $$|\vec{k}_\| - \vec{k}'_\|| = \left[ 2k^2 \pm \frac{2(\hbar\omega_{LO} \pm (E_i - E_j))}{\hbar^2} - 2k \left[ k^2 \pm \frac{2(\hbar\omega_{LO} \pm (E_i - E_j))}{\hbar^2} \right]^{1/2} \cos\theta \right]^{1/2} \quad (2)$$

-continued $$I(q_\|, z, z') = \frac{e - \sqrt{q_\|^2 + \zeta^{-2}|z-z'|}}{\sqrt{q_\|^2 + \zeta^{-2}}} \left[ 1 - \frac{|z-z'|\zeta^{-2}}{2\sqrt{q_\|^2 + \zeta^{-2}}} - \frac{\zeta^{-2}}{2(q_\|^2 + \zeta^{-2})} \right] \quad (3)$$

and $\rho_{ij}(z) = \psi_i^*(z)\psi_j(z)$ and for nanowires can be written as $$\frac{1}{\tau_{ij,a}(E)} = \quad (4)$$

$$\frac{e^2 \hbar \omega_{LO} N_{ph}}{\hbar^2} \left( \frac{1}{\epsilon_\infty} - \frac{1}{\epsilon_s} \right) \cdot \frac{2}{(2\pi)^2} \cdot \sqrt{2m^*} \cdot \left( \frac{F_a(k_x - k'_x) + F_a(k_x + k'_x)}{\sqrt{E - E_j + \hbar\omega_{LO}}} \right)$$

where $F(q_x) = \int_0^{L_y} \int_0^{L_z} \int_0^{L_y} \int_0^{L_z} dr_\| dr'_\| \rho_{ij}^*(r_\|) \rho_{ij}(r_\|) I(q_x r_\|, r'_\|)$ and $$I(q_x, r_\|, r'_\|) =$$

$$\begin{cases} \left( \sqrt{q_x^2 + \zeta^{-2}} |r_\| - r'_\|| + \frac{q_x^2 |r_\| - r'_\||}{\sqrt{q_x^2 + \zeta^{-2}}} \right) \frac{K_1\left(\sqrt{q_x^2 + \zeta^{-2}} |r_\| - r'_\||\right)}{2}, \; |r_\| - r'_\|| \neq 0 \\ \left( \frac{1}{2} + \frac{q_x^2}{2(q_x^2 + \zeta^{-2})} \right), \; |r_\| - r'_\|| = 0 \end{cases}$$

and $$\rho_{ij}(r_\|) = \psi_i^*(r_\|)\psi_j(r_\|)$$

From both the equations for ultra-thin body and nanowires, one can see that the scattering kernel is dependent on the non-local distance. The scattering kernel, in turn is integrated along with the squared of the wavefunction to get the corresponding rate for a momentum and screening length. An equivalent expression for the local case would only correspond to truncating terms other than the diagonal in the scattering kernel. The local version of scattering kernels for ultra-thin body and nanowire can be written as follows:

$$I_{Local}(q_\|, z, z') = \begin{cases} \frac{1}{\sqrt{q_\|^2 + \zeta^{-2}}} \left[ 1 - \frac{\zeta^{-2}}{2(q_\|^2 + \zeta^{-2})} \right], \; |z - z'| = 0 \\ 0, \; |z - z'| \neq 0 \end{cases} \quad (5)$$

$$I_{Local}(q_x, r_\|, r'_\|) = \begin{cases} \left( \frac{1}{2} + \frac{q_x^2}{2(q_x^2 + \zeta^{-2})} \right), \; |r_\| - r'_\|| = 0 \\ 0, \; |r_\| - r'_\|| \neq 0 \end{cases} \quad (6)$$

The scaling factor is now just a division of form factors for the local case with the non-local one. In effective mass basis, the factor as such does not have an explicit effective mass dependence (implicitly through energy-momentum relation) and depends significantly on the spatial nature of modes, dimension of the device and screening length. The scaling factor for both these cases can be represented as $$S_{UTB} = \frac{\int_0^{2\pi} d\theta \int_0^{L_z} \int_0^{L_z} dz dz' \rho_{ij}(z) \rho_{ij}(z') I(|\vec{k}_\| - \vec{k}'_\||, z, z')}{\int_0^{2\pi} d\theta \int_0^{L_z} \int_0^{L_z} dz dz' \rho_{ij}(z) \rho_{ij}(z') I_{Local}(|\vec{k}_\| - \vec{k}'_\||, z, z')} \quad (7)$$

-continued $$S_{wire} = \frac{\int_0^{L_y}\int_0^{L_z}\int_0^{L_y}\int_0^{L_z} dr_{\|} dr'_{\|} \rho^*_{ij}(r_{\|})\rho_{ij}(r'_{\|}) I(q_x, r_{\|}, r'_{\|})}{\int_0^{L_y}\int_0^{L_z}\int_0^{L_y}\int_0^{L_z} dr_{\|} dr'_{\|} \rho^*_{ij}(r_{\|})\rho_{ij}(r'_{\|}) I_{Local}(q_x, r_{\|}, r'_{\|})} \quad (8)$$

FIG. 1 illustrates the scaling factor variation with energy for different confinement thicknesses for GaAs ultra-thin body. Scaling factor is non-monotonic and shows an oscillatory behavior with increasing confinement thickness. Multiple kinks present in the scaling factor is associated with higher modes contributing to the scattering rate. Scaling factor trend with energy is captured correctly and the device becomes more and more bulk like.

Figure 2:
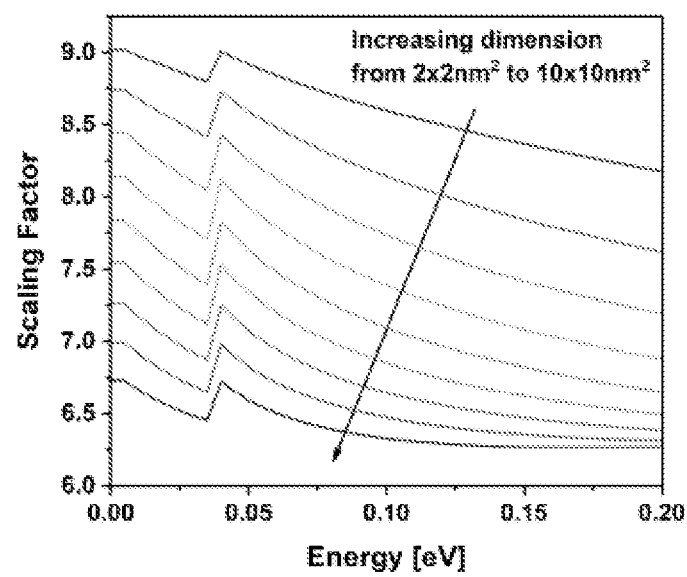
FIG. 2 illustrates the scaling trend for GaAs nanowires for dimensions ranging from $2 \times 2$ nm$^2$ up to $10 \times 10$ nm$^2$.

FIG. 2 illustrates the scaling trend for GaAs nanowires for dimensions ranging from 2×2 nm² up to 10×10 nm². Scaling factor in general is larger for wires in comparison with ultra-thin bodies and bulk devices. With increasing wire dimensions, the scaling factor decreases as expected. In literature, a scaling factor of 10× is often applied to account for the non-local nature of scattering. However, from this plot it is evident that the factor also varies sharply with dimensions.

A physics-based model using the Fermi's golden rule approach is employed to extract scaling factors for different devices. This approach is based on excluding/truncating terms within the scattering kernel to mimic local scattering and extract scaling factor from it. It is illustrated that the scaling factor is indeed energy dependent and bulk scaling factor resembling the NEGF result is achieved. Also, with increasing confinement the scaling factor increases highlighting the need for physics based local approximation model.

Example 1: A non-transitory machine readable storage medium having a machine readable program stored therein, wherein the machine readable program, when executed on a processing system, causes the processing system to perform a method of modeling a many particle system, wherein the method includes determining a compensation function, wherein the compensation function compensates errors introduced by an approximation of at least one of a plurality of interaction equations applied on the plurality of interaction equations, wherein the plurality of interaction equations comprises the approximation. The method further includes solving at least a system of the many particle system without the plurality of interaction equations to extract an uncompensated solution of the many particle system. Additionally the method includes solving the many particle system with the plurality of interaction equations by a first iteration to extract a plurality of observables in the many particle system The first iteration includes solving the plurality of interaction equations depending on a preceding solution of the many particle system to extract an uncompensated solution of the plurality of interaction equations. The first iteration further includes applying the compensation function on the uncompensated solution of the plurality of interaction equations to extract a compensated solution of the plurality of interaction equations. Additionally, the first iteration includes solving the at least the system of the many particle system with a preceding compensated solution of the plurality of interaction equations to extract an amended solution of the many particle system. Moreover, the first iteration includes comparing the preceding solution of the many particle system with the amended solution of the many particle system to determine a variation between the preceding solution of the many particle system and the amended solution of the many particle system. Furthermore, the first iteration includes comparing the variation against a user defined convergence criteria, thereby ascertaining the plurality of observables of the preceding solution to the many particle system The method also includes modeling the many particle system based on the plurality of observables, wherein the plurality of observables includes at least one of charge density, particle density, heat density, spin density, color charge density, chirality density, current density, particle current density, heat current density, spin current density, density of states, or chirality current density.

In some embodiments, the variation is below the user defined convergence criteria. In some embodiments, where the variation is above or equal to the user defined convergence criteria, the method further includes calculating the many particle system with the plurality of interaction equations by a subsequent iteration to extract the plurality of observables in the many particle system.

In one or more embodiments, the subsequent iteration ranges from 1 to 30. In some embodiments, the subsequent iteration is carried out until the variation is below the user defined convergence criteria.

In at least one embodiments, the determining a compensation function includes determining an aspect of the plurality of interaction equations, wherein each interaction equation of the plurality of interaction equations includes a plurality of aspects. Additionally, the determining the compensation function includes determining the aspect of a plurality of pristine interaction equations, wherein each pristine interaction equation of the plurality of pristine interaction equations includes a plurality of aspects. Moreover, the determining the compensation function includes comparing the aspect of the plurality of interaction equations with the aspect of the plurality of pristine interaction equations to extract the compensation function.

The each pristine interaction equation of the plurality of pristine interaction equations includes an interaction equation without the approximation.

The comparing the aspect of the plurality of interaction equations with the aspect of the plurality of pristine interaction equations to extract the compensation function includes at least one of: dividing the aspect of the plurality of interaction equations with the aspect of the plurality of pristine interaction equations to extract the compensation function, adding the aspect of the plurality of interaction equations with the aspect of the plurality of pristine interaction equations to extract the compensation function, subtracting the aspect of the plurality of interaction equations with the aspect of the plurality of pristine interaction equations to extract the compensation function; and multiplying the aspect of the plurality of interaction equations with the aspect of the plurality of pristine interaction equations to extract the compensation function.

In some embodiments, the aspect includes at least one of interaction strength, interaction frequency, interaction shape, interaction range, interaction results, interaction rate, or interaction phase space.

The approximation includes at least one of interaction strength, interaction frequency, interaction shape, interaction range, interaction results, interaction rate, or interaction phase space.

The solving the at least the system of the many particle system without the plurality of interaction equations to extract the uncompensated solution of the many particle system includes at least one of: solving using non-equilibrium Green's method, solving using Boltzmann transport method, solving using a density matrix method, solving using a master equation method, solving using a quantum Monte Carlo method, or solving using a Wigner function method.

The many particle system includes at least one of electrons, photons, protons, spinons, skyrmions, polarons, polaritons, atoms, Cooper pairs, Bloch waves, magnons, plasmons, anyons, Fermions, Bosons, mesons, or Baryons.

The solving the many particle system with the plurality of interaction equations by the first iteration to extract the plurality of observables in the many particle system includes at least one of solving using non-equilibrium Green's method, solving using Boltzmann transport method, solving using a density matrix method, solving using a master equation method, solving using a quantum Monte Carlo method, or solving using a Wigner function method.

The solving the plurality of interaction equations depending on the preceding solution of the many particle system to extract the uncompensated solution of the plurality of interaction equations includes at least one of: solving using non-equilibrium Green's method, solving using Boltzmann transport method, solving using a density matrix method, solving using a master equation method, solving using a quantum Monte Carlo method, or solving using a Wigner function method.

The applying the compensation function on the uncompensated solution of the plurality of interaction equations to extract the compensated solution of the plurality of interaction equations includes at least one of: multiplying the compensation function with at least one interaction equation of the plurality of interaction equations, dividing the compensation function with at least one interaction equation of the plurality of interaction equations, subtracting the compensation function with at least one interaction equation of the plurality of interaction equations, or adding the compensation function with at least one interaction equation of the plurality of interaction equations.

The solving the at least the system of the many particle system with the preceding compensated solution of the plurality of interaction equations to extract the amended solution of the many particle system includes at least one of solving using non-equilibrium Green's method, solving using Boltzmann transport method, solving using a density matrix method, solving using a master equation method, solving using a quantum Monte Carlo method, or solving using a Wigner function method.

Example 2: A software architecture includes a first protocol, wherein the first protocol is configured to determine a compensation function, wherein the compensation function is configured to compensate errors introduced by an approximation of at least one of a plurality of interaction equations applied on the plurality of interaction equations, wherein the plurality of interaction equations includes the approximation. The architecture further includes a second protocol, wherein the second protocol is configured to solve at least a system of the many particle system without the plurality of interaction equations to extract an uncompensated solution of the many particle system. Additionally the architecture includes a third protocol, wherein the third protocol is configured to solve the many particle system with the plurality of interaction equations by a first iteration to extract a plurality of observables in the many particle system The first iteration includes a fourth protocol, wherein the fourth protocol is configured to solve the plurality of interaction equations depending on a preceding solution of the many particle system to extract an uncompensated solution of the plurality of interaction equations. The first iteration further includes a fifth protocol, wherein the fifth protocol is configured to apply the compensation function on the uncompensated solution of the plurality of interaction equations to extract a compensated solution of the plurality of interaction equations. Additionally, the first iteration includes a sixth protocol, wherein the sixth protocol is configured to solve the at least the system of the many particle system with a preceding compensated solution of the plurality of interaction equations to extract an amended solution of the many particle system. Moreover, the first iteration includes a seventh protocol, wherein the seventh protocol is configured to compare the preceding solution of the many particle system with the amended solution of the many particle system to determine a variation between the preceding solution of the many particle system and the amended solution of the many particle system. Furthermore, the first iteration includes an eighth protocol, wherein the eighth protocol is configured to compare the variation against a user defined convergence criteria, thereby ascertaining the plurality of observables of the preceding solution to the many particle system The architecture also includes a ninth protocol, wherein the ninth protocol is configured to model the many particle system based on the plurality of observables, wherein the plurality of observables includes at least one of charge density, particle density, heat density, spin density, color charge density, chirality density, current density, particle current density, heat current density, spin current density, density of states, or chirality current density.

In some embodiments, the variation is below the user defined convergence criteria. In some embodiments, where the variation is above or equal to the user defined convergence criteria, the architecture further includes a ninth protocol, wherein the ninth protocol is configured to calculate the many particle system with the plurality of interaction equations by a subsequent iteration to extract the plurality of observables in the many particle system.

In one or more embodiments, the subsequent iteration ranges from 1 to 30. In some embodiments, the subsequent iteration is carried out until the variation is below the user defined convergence criteria.

In at least one embodiments, the first protocol includes a first procedure, wherein the first procedure is configured to determine an aspect of the plurality of interaction equations, wherein each interaction equation of the plurality of interaction equations includes a plurality of aspects. Additionally, the first protocol includes a second procedure, wherein the second procedure is configured to determine the aspect of a plurality of pristine interaction equations, wherein each pristine interaction equation of the plurality of pristine interaction equations includes a plurality of aspects. Moreover, the first protocol includes a third procedure, wherein the third procedure is configured to compare the aspect of the plurality of interaction equations with the aspect of the plurality of pristine interaction equations to extract the compensation function.

The each pristine interaction equation of the plurality of pristine interaction equations includes an interaction equation without the approximation.

The third procedure includes at least one of: a tenth protocol, wherein the tenth protocol is configured to divide the aspect of the plurality of interaction equations with the aspect of the plurality of pristine interaction equations to extract the compensation function; an eleventh protocol, wherein the eleventh protocol is configured to add the aspect of the plurality of interaction equations with the aspect of the plurality of pristine interaction equations to extract the compensation function; a twelfth protocol, wherein the twelfth protocol is configured to subtract the aspect of the plurality of interaction equations with the aspect of the plurality of pristine interaction equations to extract the compensation function; and a thirteenth protocol, wherein the thirteenth protocol is configured to multiply the aspect of the plurality of interaction equations with the aspect of the plurality of pristine interaction equations to extract the compensation function.

In some embodiments, the aspect includes at least one of interaction strength, interaction frequency, interaction shape, interaction range, interaction results, interaction rate, or interaction phase space.

The approximation includes at least one of interaction strength, interaction frequency, interaction shape, interaction range, interaction results, interaction rate, or interaction phase space.

The second protocol includes at least one of: a fourteenth protocol, wherein the fourteenth protocol is configured to solve using non-equilibrium Green's method; a fifteenth protocol, wherein the fifteenth protocol is configured to solve using Boltzmann transport method; a sixteenth protocol, wherein the sixteenth protocol is configured to solve using a density matrix method; a seventeenth protocol, wherein the seventeenth protocol is configured to solve using a master equation method; an eighteenth protocol, wherein the eighteenth protocol is configured to solve using a quantum Monte Carlo method; or a nineteenth protocol, wherein the nineteenth protocol is configured to solve using a Wigner function method.

The many particle system includes at least one of electrons, photons, protons, spinons, skyrmions, polarons, polaritons, atoms, Cooper pairs, Bloch waves, magnons, plasmons, anyons, Fermions, Bosons, mesons, or Baryons.

The third protocol includes at least one of the fourteenth protocol, the fifteenth protocol, the sixteenth protocol, the seventeenth protocol, the eighteenth protocol, or the nineteenth protocol.

The first procedure includes at least one of: the fourteenth protocol, the fifteenth protocol, the sixteenth protocol, the seventeenth protocol, the eighteenth protocol, or the nineteenth protocol The second procedure includes at least one of: a twentieth protocol, wherein the twentieth protocol is configured to multiply the compensation function with at least one interaction equation of the plurality of interaction equations; a twenty-first protocol, wherein the twenty-first protocol is configured to divide the compensation function with at least one interaction equation of the plurality of interaction equations; a twenty-second protocol, wherein the twenty-second protocol is configured to subtract the compensation function with at least one interaction equation of the plurality of interaction equations; or a twenty-third protocol, wherein the twenty-third protocol is configured to add the compensation function with at least one interaction equation of the plurality of interaction equations.

The third procedure includes at least one the fourteenth protocol, the fifteenth protocol, the sixteenth protocol, the seventeenth protocol, the eighteenth protocol, or the nineteenth protocol.

Figure 3:
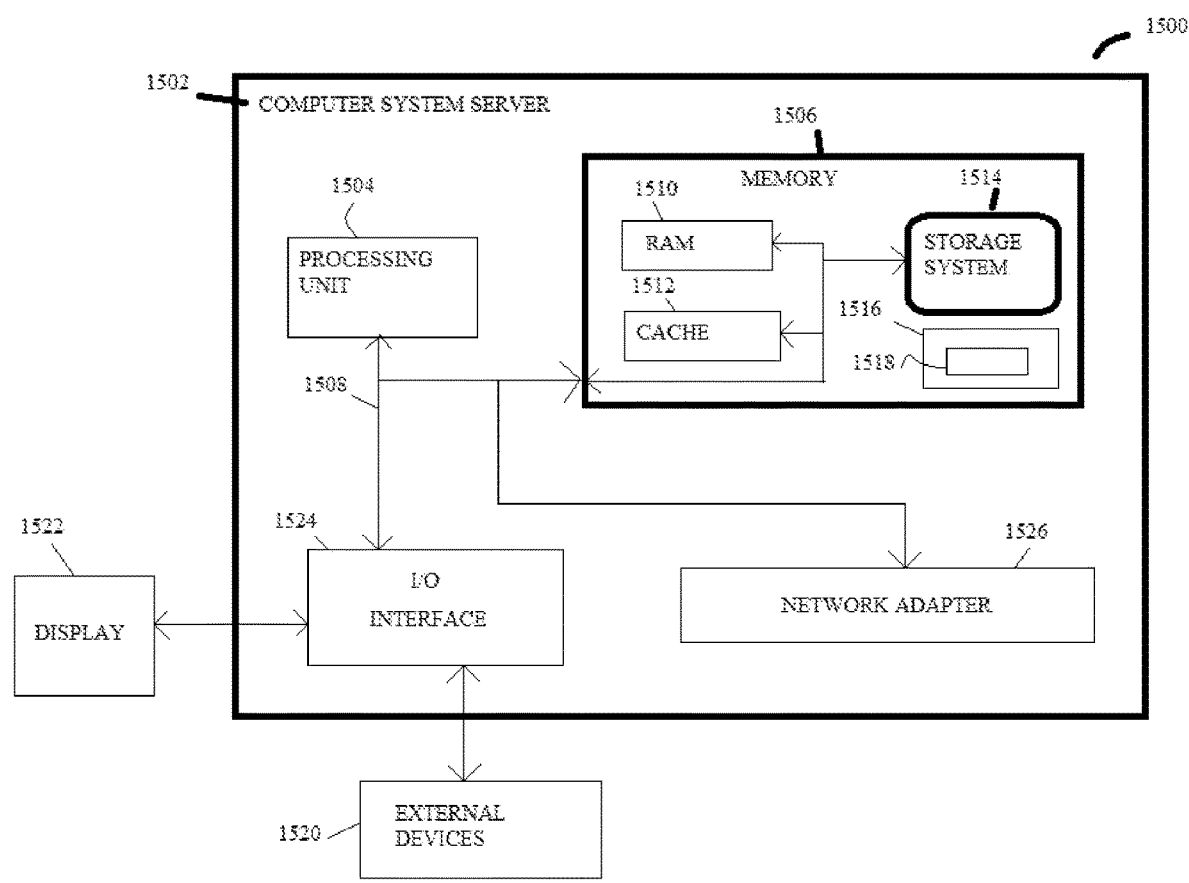
FIG. 3 illustrates one example of a computing or processing node 1500 for operating a method or a software architecture in accordance with the present application.

FIG. 3 illustrates one example of a computing or processing node 1500 for operating the methods and the software architecture of the present application. This is not intended to suggest any limitation as to the scope of use or functionality of embodiments of the invention described herein. Regardless, the computing node 1500 is capable of being implemented and/or performing any of the functionality set forth hereinabove.

In computing node 1500 there is a computer system/server 1502, which is operational with numerous other general purpose or special purpose computing system environments or configurations. Examples of well-known computing systems, environments, and/or configurations that may be suitable for use with computer system/server 1502 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1502 may be described in the general context of computer system executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1502 in cloud computing node 1500 is shown in the form of a general-purpose computing device. The components of computer system/server 1502 may include, but are not limited to, one or more processors or processing units 1504, a system memory 1506, and a bus 1508 that couples various system components including system memory 1506 to processor 1504.

Bus 1508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1502 typically includes a variety of computer system readable media. Such media may be any available media that is accessible by computer system/server 1502, and it includes both volatile and non-volatile media, removable and non-removable media.

System memory 1506, in one embodiment, implements the methods and the software architectures of the present application. The system memory 506 can include computer system readable media in the form of volatile memory, such as random access memory (RAM) 1510 and/or cache memory 1512. Computer system/server 1502 may further include other removable/non-removable, volatile/non-volatile computer system storage media. By way of example only, storage system 1514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1508 by one or more data media interfaces. As will be further depicted and described below, memory 1506 may include at least one program product having a set (e.g., at least one) of program modules that are configured to carry out the functions of various embodiments of the invention.

Program/utility 1516, having a set (at least one) of program modules 1518, may be stored in memory 1506 by way of example, and not limitation, as well as an operating system, one or more application programs, other program modules, and program data. Each of the operating system, one or more application programs, other program modules, and program data or some combination thereof, may include an implementation of a networking environment. Program modules 1518 generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer system/server 1502 may also communicate with one or more external devices 1520 such as a keyboard, a pointing device, a display 1522, etc.; one or more devices that enable a user to interact with computer system/server 1502; and/or any devices (e.g., network card, modem, etc.) that enable computer system/server 1502 to communicate with one or more other computing devices. Such communication can occur via I/O interfaces 1524. Still yet, computer system/server 1502 can communicate with one or more networks such as a local area network (LAN), a general wide area network (WAN), and/or a public network (e.g., the Internet) via network adapter 1526. As depicted, network adapter 1526 communicates with the other components of computer system/server 1502 via bus 1508. It should be understood that although not shown, other hardware and/or software components could be used in conjunction with computer system/server 1502. Examples, include, but are not limited to: microcode, device drivers, redundant processing units, external disk drive arrays, RAID systems, tape drives, and data archival storage systems, etc.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, design, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The invention claimed is:

1. A non-transitory machine-readable storage medium having a machine-readable program stored therein, wherein the machine-readable program, when executed on a processing system, causes the processing system to perform a physics-based local approximation method of modeling a many particle system, wherein the method comprises:
   determining a compensation function that, when applied to a plurality of interaction equations, compensates for errors introduced by an approximation included in at least one of the plurality of interaction equations;
   determining an uncompensated solution of the many particle system by solving the many particle system without the plurality of interaction equations;
   calculating a plurality of observables in the many particle system by solving the many particle system with the plurality of interaction equations by a first iteration, wherein the first iteration comprises:
      determining an uncompensated solution of the plurality of interaction equations by solving the plurality of interaction equations depending on a preceding solution of the many particle system;
      determining a compensated solution of the plurality of interaction equations by applying the compensation function to the uncompensated solution of the plurality of interaction equations;
      determining an amended solution of the many particle system by solving the many particle system with a preceding compensated solution of the plurality of interaction equations;
      determining a variation between the preceding solution of the many particle system and the amended solution of the many particle system by comparing the preceding solution of the many particle system with the amended solution of the many particle system; and
      comparing the variation against a user defined convergence criteria, thereby ascertaining the plurality of observables of the preceding solution to the many particle system; and
   modeling the many particle system based on the plurality of observables calculated from the physics-based local approximation to improve computational efficiency, wherein the plurality of observables includes at least one of a charge density, a particle density, a heat density, a spin density, a color charge density, a chirality density, a current density, a particle current density, a heat current density, a spin current density, a density of states, and a chirality current density.

2. The non-transitory machine-readable storage medium of claim 1, wherein the variation satisfies the user defined convergence criteria when the variation is less than the user defined convergence criteria.

3. The non-transitory machine-readable storage medium of claim 1, wherein, if the variation is greater than or equal to the user defined convergence criteria in the first iteration, the calculating the plurality of observables in the many particle system further comprises:
  performing at least one subsequent iteration to ascertain the plurality of observables in the many particle system.

4. The non-transitory machine-readable storage medium of claim 3, wherein the at least one subsequent iteration ranges from 1 to 30 iterations.

5. The non-transitory machine-readable storage medium of claim 3, wherein the at least one subsequent iteration is carried out until the variation is less than the user defined convergence criteria.

6. The non-transitory machine-readable storage medium of claim 1, the determining a compensation function further comprising:
  determining an aspect of the plurality of interaction equations, each interaction equation of the plurality of interaction equations having a plurality of aspects;
  determining the aspect of a plurality of pristine interaction equations, each pristine interaction equation of the plurality of pristine interaction equations having a plurality of aspects; and
  determining the compensation function by comparing the aspect of the plurality of interaction equations with the aspect of the plurality of pristine interaction equations.

7. The non-transitory machine-readable storage medium of claim 6, wherein each pristine interaction equation of the plurality of pristine interaction equations is an interaction equation without the approximation.

8. The non-transitory machine-readable storage medium of claim 6, the comparing the aspect of the plurality of interaction equations with the aspect of the plurality of pristine interaction equations further comprising at least one of:
  determining the compensation function by dividing the aspect of the plurality of interaction equations with the aspect of the plurality of pristine interaction equations;
  determining the compensation function by adding the aspect of the plurality of interaction equations with the aspect of the plurality of pristine interaction;
  determining the compensation function by subtracting the aspect of the plurality of interaction equations with the aspect of the plurality of pristine interaction equations; and
  determining the compensation function by multiplying the aspect of the plurality of interaction equations with the aspect of the plurality of pristine interaction equations.

9. The non-transitory machine-readable storage medium of claim 6, wherein the aspect includes at least one of an interaction strength, an interaction frequency, an interaction shape, an interaction range, an interaction result, an interaction rate, and an interaction phase space.

10. The non-transitory machine-readable storage medium of claim 1, wherein the approximation includes at least one of an interaction strength, an interaction frequency, an interaction shape, an interaction range, an interaction result, an interaction rate, and an interaction phase space.

11. The non-transitory machine-readable storage medium of claim 1, the solving the many particle system without the plurality of interaction equations further comprising at least one of:
  solving using non-equilibrium Green's method;
  solving using Boltzmann transport method;
  solving using a density matrix method;
  solving using a master equation method;
  solving using a quantum Monte Carlo method; and
  solving using a Wigner function method.

12. The non-transitory machine-readable storage medium of claim 1, wherein the many particle system includes at least one of electrons, photons, protons, spinons, skyrmions, polarons, polaritons, atoms, Cooper pairs, Bloch waves, magnons, plasmons, anyons, Fermions, Bosons, mesons, and Baryons.

13. The non-transitory machine-readable storage medium of claim 1, the solving the many particle system with the plurality of interaction equations by the first iteration further comprising at least one of:
  solving using non-equilibrium Green's method;
  solving using Boltzmann transport method;
  solving using a density matrix method;
  solving using a master equation method;
  solving using a quantum Monte Carlo method; and
  solving using a Wigner function method.

14. The non-transitory machine-readable storage medium of claim 1, the solving the plurality of interaction equations depending on the preceding solution of the many particle system further comprising at least one of:
  solving using non-equilibrium Green's method;
  solving using Boltzmann transport method;
  solving using a density matrix method;
  solving using a master equation method;
  solving using a quantum Monte Carlo method; and
  solving using a Wigner function method.

15. The non-transitory machine-readable storage medium of claim 1, the applying the compensation function to the uncompensated solution of the plurality of interaction equations further comprising at least one of:
  multiplying the compensation function with at least one interaction equation of the plurality of interaction equations;
  dividing the compensation function with at least one interaction equation of the plurality of interaction equations;
  subtracting the compensation function with at least one interaction equation of the plurality of interaction equations; and
  adding the compensation function with at least one interaction equation of the plurality of interaction equations.

16. The non-transitory machine-readable storage medium of claim 1, the solving the many particle system with the preceding compensated solution of the plurality of interaction equations at least one of:
  solving using non-equilibrium Green's method;
  solving using Boltzmann transport method;
  solving using a density matrix method;
  solving using a master equation method;
  solving using a quantum Monte Carlo method; and
  solving using a Wigner function method.

17. A non-transitory machine-readable storage medium having a machine-readable program stored therein, wherein the machine-readable program, when executed on a processing system, causes the processing system to perform a physics-based local approximation method of modeling a many particle system, wherein the method comprises:
  determining a compensation function that, when applied to a plurality of interaction equations, compensates for errors introduced by an approximation included in at least one of the plurality of interaction equations;

determining an uncompensated solution of the many particle system by solving the many particle system without the plurality of interaction equations;
calculating a plurality of observables in the many particle system by solving the many particle system with the plurality of interaction equations by a first iteration, wherein the first iteration comprises:
  determining an uncompensated solution of the plurality of interaction equations by solving the plurality of interaction equations depending on a preceding solution of the many particle system;
  determining a compensated solution of the plurality of interaction equations by applying the compensation function to the uncompensated solution of the plurality of interaction equations;
  determining an amended solution of the many particle system by solving the many particle system with a preceding compensated solution of the plurality of interaction equations;
  determining a variation between the preceding solution of the many particle system and the amended solution of the many particle system by comparing the preceding solution of the many particle system with the amended solution of the many particle system; and
  comparing the variation against a user defined convergence criteria, thereby ascertaining the plurality of observables of the preceding solution to the many particle system; and
modeling the many particle system based on the plurality of observables calculated from the physics-based local approximation to improve computational efficiency, wherein the plurality of observables includes at least one of a charge density, a particle density, a heat density, a spin density, a color charge density, a chirality density, a current density, a particle current density, a heat current density, a spin current density, a density of states, and a chirality current density,
wherein, if the variation is greater than or equal to the user defined convergence criteria in the first iteration, the calculating the plurality of observables in the many particle system further comprises:
  performing at least one subsequent iteration to ascertain the plurality of observables in the many particle system.

18. A non-transitory machine-readable storage medium having a machine-readable program stored therein, wherein the machine readable program, when executed on a processing system, causes the processing system to perform a physics-based local approximation method of modeling a many particle system, wherein the method comprises:
  determining a compensation function that, when applied to a plurality of interaction equations, compensates for errors introduced by an approximation included in at least one of the plurality of interaction equations;
  determining an uncompensated solution of the many particle system by solving the many particle system without the plurality of interaction equations;
  calculating a plurality of observables in the many particle system by solving the many particle system with the plurality of interaction equations by a first iteration wherein the first iteration comprises:
    determining an uncompensated solution of the plurality of interaction equations by solving the plurality of interaction equations depending on a preceding solution of the many particle system;
    determining a compensated solution of the plurality of interaction equations by applying the compensation function to the uncompensated solution of the plurality of interaction equations;
    determining an amended solution of the many particle system by solving the many particle system with a preceding compensated solution of the plurality of interaction equations;
    determining a variation between the preceding solution of the many particle system and the amended solution of the many particle system by comparing the preceding solution of the many particle system with the amended solution of the many particle system; and
    comparing the variation against a user defined convergence criteria, thereby ascertaining the plurality of observables of the preceding solution to the many particle system; and
  modeling the many particle system based on the plurality of observables calculated from the physics-based local approximation to improve computational efficiency, wherein the plurality of observables includes at least one of a charge density, a particle density, a heat density, a spin density, a color charge density, a chirality density, a current density, a particle current density, a heat current density, a spin current density, a density of states, and a chirality current density,
  wherein the variation satisfies the user defined convergence criteria when the variation is less than the user defined convergence criteria.

* * * * *